July 26, 1960 A. M. McFARLANE 2,946,470
MACHINE FOR REMOVING COVERS AND CONTENTS FROM CONTAINER
Filed April 29, 1959 4 Sheets-Sheet 1
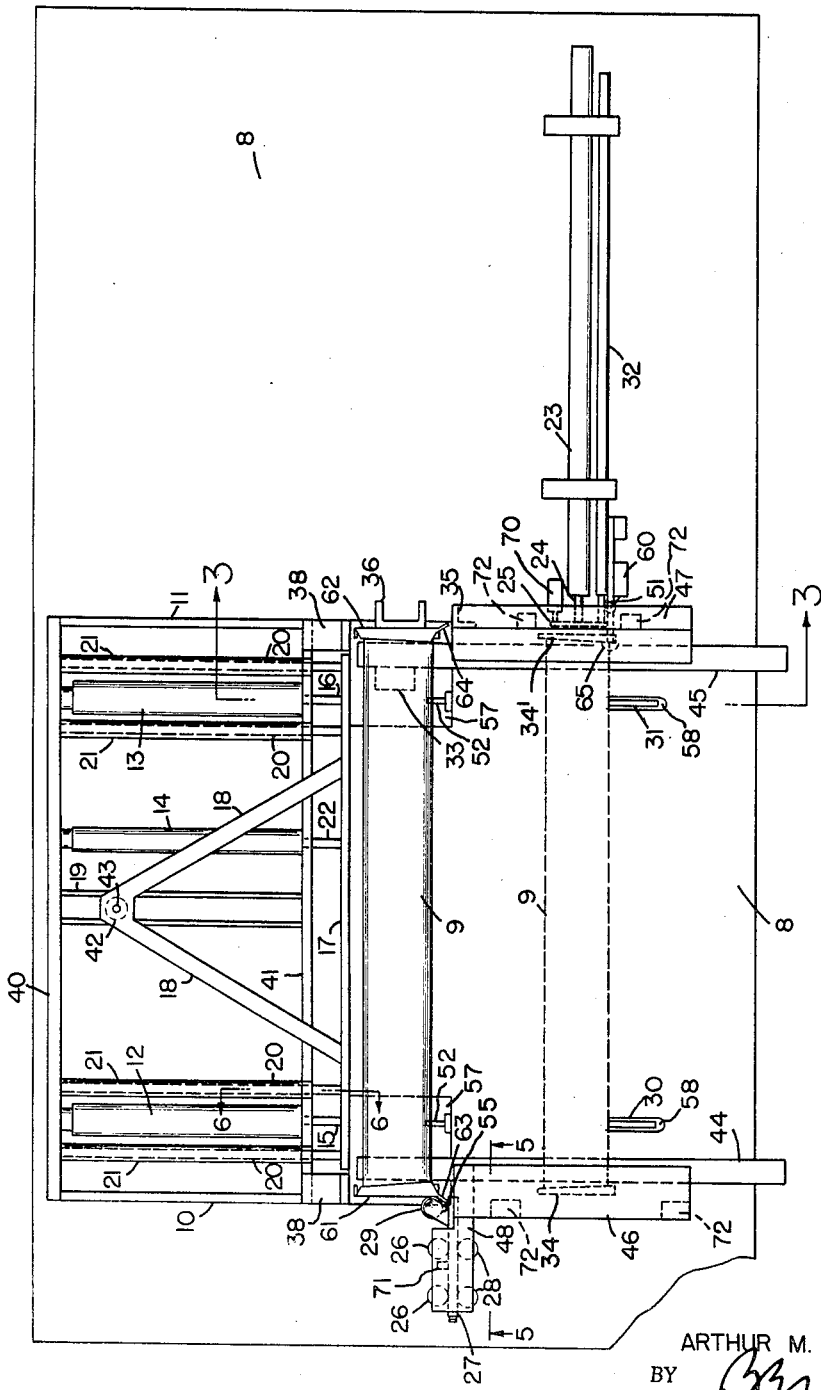
FIG. I.
INVENTOR.
ARTHUR M. MC FARLANE
BY
Attorney

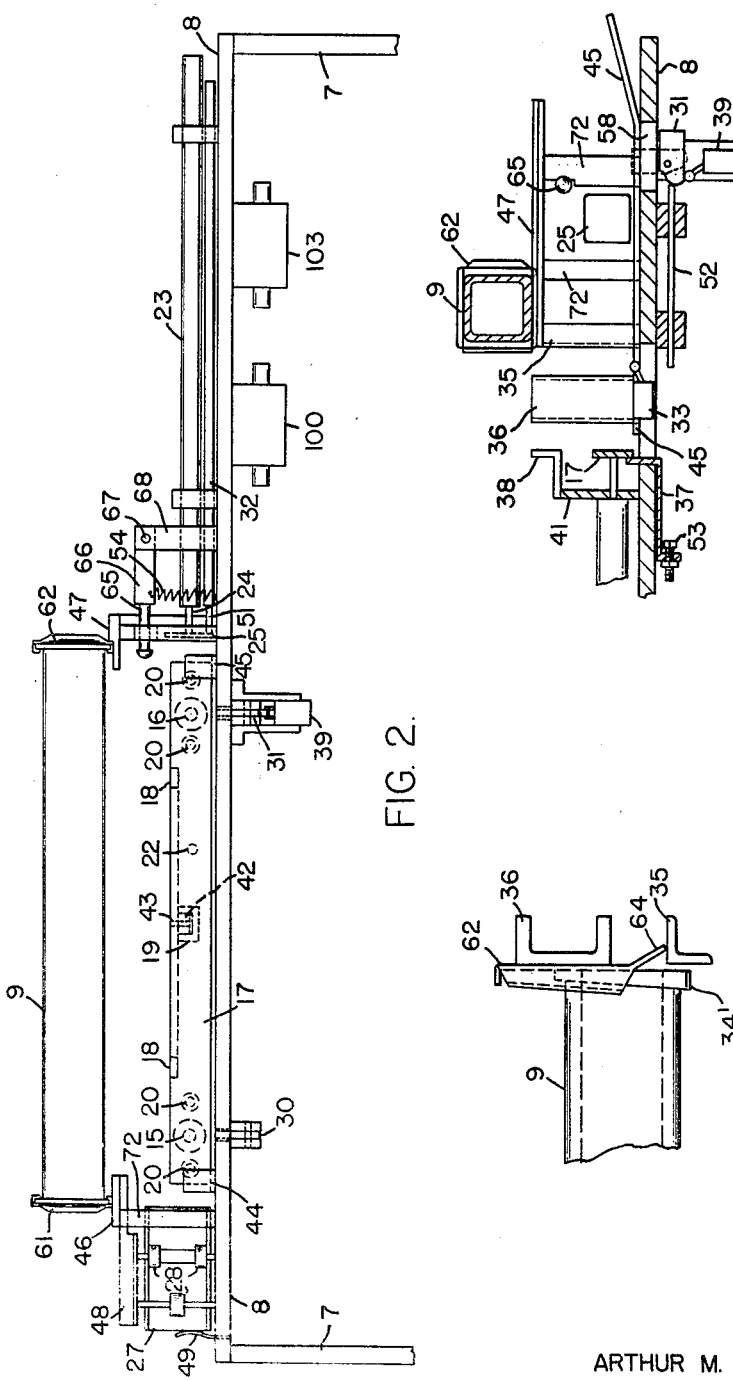

July 26, 1960   A. M. McFARLANE   2,946,470
MACHINE FOR REMOVING COVERS AND CONTENTS FROM CONTAINER
Filed April 29, 1959   4 Sheets-Sheet 3

INVENTOR.
ARTHUR M MC FARLANE
BY
Attorney

July 26, 1960  A. M. McFARLANE  2,946,470
MACHINE FOR REMOVING COVERS AND CONTENTS FROM CONTAINER
Filed April 29, 1959  4 Sheets-Sheet 4

INVENTOR.
ARTHUR M. MC FARLANE
BY
Attorney

United States Patent Office 2,946,470
Patented July 26, 1960

2,946,470

MACHINE FOR REMOVING COVERS AND CONTENTS FROM CONTAINER

Arthur M. McFarlane, Rochester, N.Y., assignor to Russer's, Inc., Rochester, N.Y., a corporation of New York Filed Apr. 29, 1959, Ser. No. 809,780

3 Claims. (Cl. 214—304)

This invention relates to a food handling machine, and more particularly to an improved machine for removing cooked meat or other solid food from a container prior to slicing, packaging, or further handling.

In certain types of food processing, such as making meat loaves, for instance, the food is cooked by steam in elongated metal containers which are tightly closed at both ends by removable metal covers. After cooking, it is necessary to remove the covers from both ends of the container to remove the food therefrom for further processing.

Heretofore, when the cooking operation was completed, a manual operation was required to remove the covers from both ends of the container and remove the food therefrom. Because of the extreme heat, to which the containers are subjected in the cooking process, they are difficult to handle; and they are usually allowed to cool to some extent before trying to remove the covers. This contracts the covers on the containers and makes them more difficult to remove. An operator, and usually women are employed in this task, has had to use a hammer to effect the cover removal, and then has had to push the cooked meat loaf out of the container as best she could. These are laborious time-consuming tasks and often result in injury to the fingers of the operator, and in breaking or otherwise damaging the contents of the container.

One of the objects of this invention is to provide an improved machine for mechanically removing the covers from both ends of a food container of the type described.

Another object of the invention is to provide a machine which will not only mechanically remove the covers from the container, but will also mechanically remove the contents therefrom.

Another object of this invention is to provide a machine having automatic means for simultaneously removing the covers from both ends of a food container while the machine is moving the container into position for mechanically removing its contents.

Other objects of this invention will be obvious from the accompanying drawings, the specification, and the appended claims.

In the drawings:

Fig. 1 is a plan view of a machine built according to one embodiment of this invention, one of the containers being shown in full lines in a cover-stripping position and a second container being shown in dotted lines at the meat-removing station;

Fig. 2 is a front view of the machine with a container awaiting to be placed in operating position;

Figure 4:
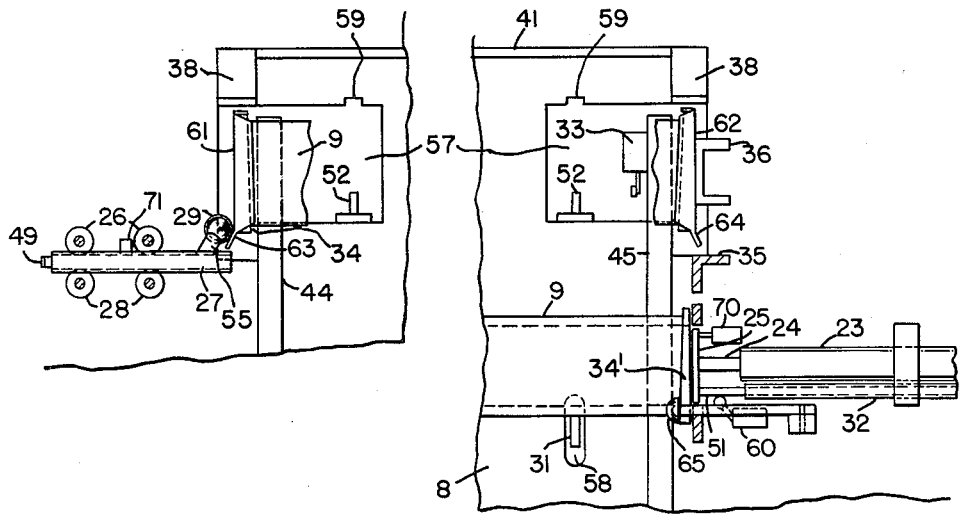
Figure 5:
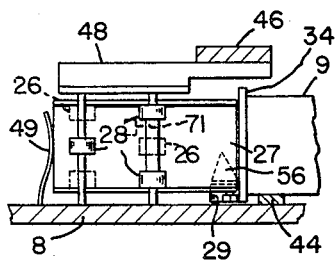
Figure 6:
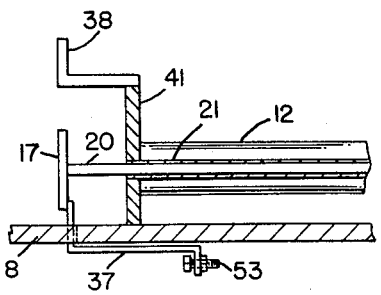
Figures 9, 10:
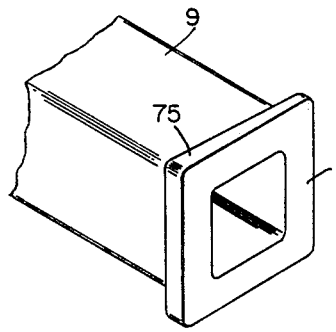
Figure 7:
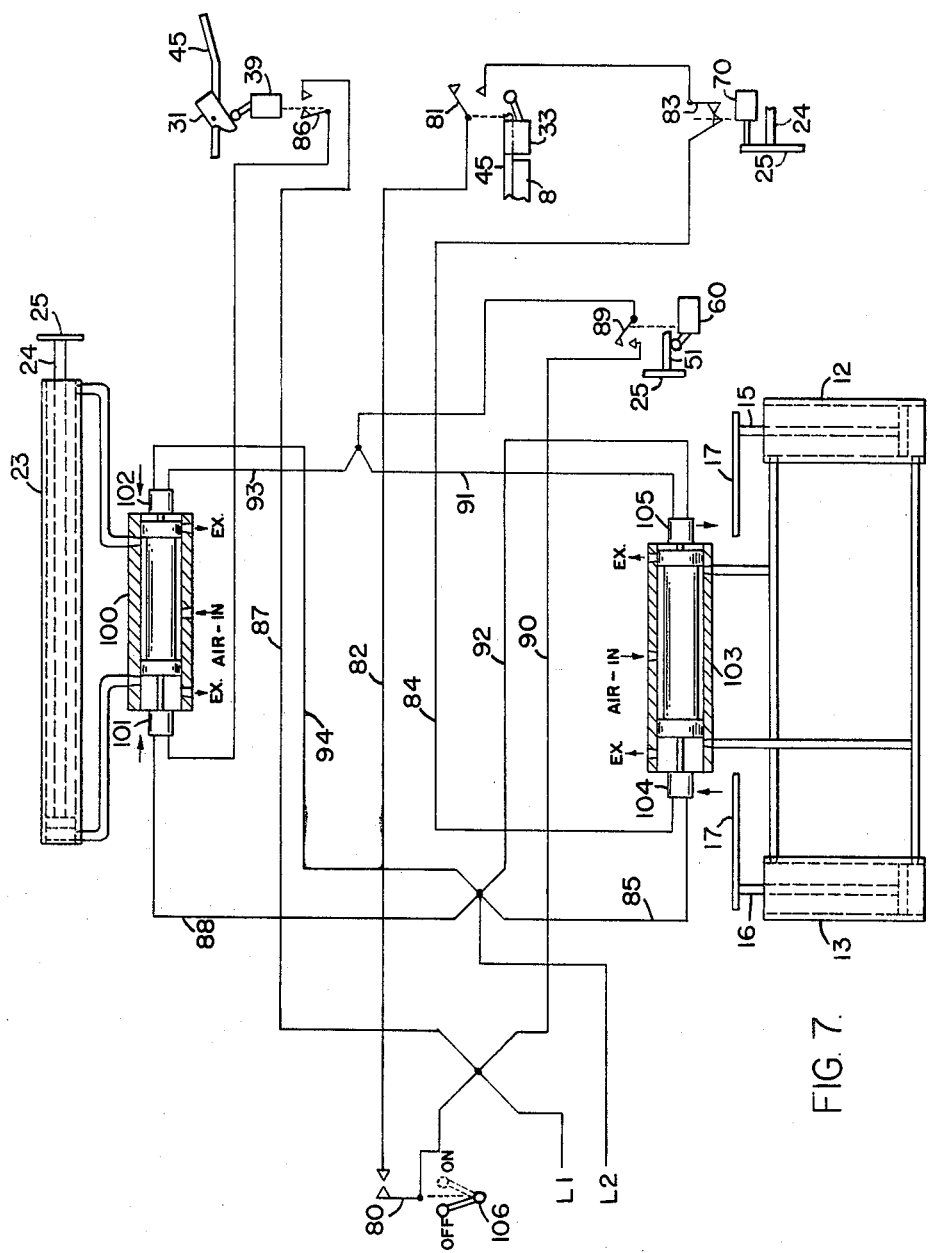

Fig. 3 is a section through the machine taken on the line 3—3 of Fig. 1 looking in the direction of the arrows, but showing only a container awaiting to be placed in operating position, Fig. 4 is a fragmentary plan view of the machine with the pusher bar and the upper rails being omitted for the sake of clarity, and showing one container fragmentarily in position just prior to the removal of its covers and showing another container fragmentarily in position at the meat-removing station;

Fig. 5 is an enlarged fragmentary cross section view of the apparatus taken at line 5—5 of Fig. 1, looking in the direction of the arrows and showing a portion of a container with the cover removed;

Fig. 6 is a fragmentary cross sectional view of the apparatus taken at line 6—6 of Fig. 1 without the container;

Fig. 7 is a diagrammatic sketch of the circuitry, switches, pneumatic cylinders and valves for operating the machine;

Fig. 8 is a fragmentary plan view illustrating how one of the cover removal stops operates to remove a cover from the container, the cover being shown removed;

Fig. 9 is a fragmentary perspective view of a typical container with one of its covers removed; and Fig. 10 is an enlarged perspective view of one of the covers of the container.

The illustrated embodiment of the invention is adapted to remove the covers and contents from an elongated tubular container having two removable end covers wedged onto the two flanged ends of the container. The apparatus comprises a base upon which the container is placed, and cover removal means located on each side of the base in such a position as to engage and remove each end cover of the container as the container is moved on the base by a pneumatically-operated pusher bar. This pusher bar engages the container between its ends and pushes it past the cover removal means and then to a contents removal station. A second pneumatically-operated contents pusher or removal head is adapted to move longitudinally through the container at this contents removal station thereby pushing the contents of the container ahead of it and from the container.

One type of container on which the machine is adapted to operate is shown in the drawings and is denoted at 9. It is elongated, rectangular and tubular. The ends of this container or can 9 are flanged as denoted at 34 and 34'; and two parallel sides 75 of these flanges are tapered from end to end as shown in Fig. 9 so that they are wedge-shaped for wedgingly receiving the cooperating female wedge-shaped portions 76 of the respective covers 61 and 62. The covers 61 and 62 have outwardly extending lips 63 and 64, respectively, which serve, as will be described later, to engage the cover stripping means.

The machine itself comprises a flat base plate 8 (Figs. 1 and 2) that is mounted on legs 7 which are of convenient operating height. Rigidly secured on the base 8 is a rectangular frame formed of a rear member 40, side members 10 and 11, and a front member 41. A guide channel 19 is secured between the front and rear members 40 and 41 midway between and parallel to the side members 10 and 11. Mounted to slide in the guide channel 19 is a roller 42, to which is secured a generally V-shaped frame 18 by means of a stud 43. The forwardly extending legs of the frame 18 are secured at their front ends to a pusher bar 17, which is positioned parallel to and in front of the front member 41.

Pneumatic cylinders 12 and 13 are rigidly secured in the rectangular frame between the rear and front members 40 and 41 thereof and parallel to the side members 10 and 11 thereof. Reciprocable in the cylinders 12 and 13, respectively, are pistons which have piston rods 15 and 16, respectively (Fig. 7), secured thereto. The forward ends of the pistons 15 and 16 are rigidly secured to the pusher bar 17. Disposed at opposite sides of each of the cylinders 12 and 13 are tubes 21 (Fig. 1). Reciprocable in these tubes are guide bars 20, the forward ends of which are secured to the pusher bar 17.

Disposed between and parallel to the cylinders 12 and 13 is a cylinder 14 which is also connected to the members 40 and 41. Reciprocable in the cylinder 14 is a piston which is securely attached at its front end by means of its piston rod 22 to the pusher bar 17. This piston acts as a shock absorber.

The piston rods 15 and 16 operate to move the pusher bar from a retracted position to its forward limit position at the meat removing station and back. The guide bars 20 in their respective cylinders prevent excessive misalignment or twisting of the piston rods 15 and 16 during their operation. The shock absorbing piston 22 causes the pusher bar 17 to reciprocate in a smooth manner during operation.

Supported above the base 8 by uprights 35 and 72 are rails 46 and 47, which provide supporting surfaces for containers waiting to be handled by the machine.

Mounted on top of the member 40 at opposite lateral ends thereof and spaced rearwardly from the rear ends of the rails 46 and 47 are two angular-shaped members 38 (Figs. 1, 3, 4 and 6), each of which has a vertical side which extends above and which is approximately in vertical line with the pusher bar 17 in its retracted position, as shown in Fig. 6.

Elongated guideways 44 and 45 (Figs. 1 and 3) are secured on top of the base 8 beneath but laterally slightly inside the rails 46 and 47. They extend in a forward direction in front of the pusher bar 17. The front ends of the guideways 44 and 45 are bent upward adjacent the front edge of the base 8 as shown in Fig. 3. The guideways 44 and 45 support the container during the operation of the machine. The space between the members 38 and the rear ends of the rails 46 and 47 provides room for a container to be moved off the rear ends of the rails and to be dropped onto the guideways 46 and 47 in position for removal of the covers therefrom.

A guide rail 36 (Figs. 1, 4 and 6) disposed between rail 47 and one of the members 38 serves to position the container laterally on the rails 44 and 45 by engagement with the right hand cover 62 of the container. This rail also acts as a guide for the container as it drops into position for removal of its covers therefrom. Mounted at the bottom of said rail 36 in position to be tripped by the right hand cover is a switch 33 (Fig. 3) which, when tripped, initiates the automatic operation of the machine as will be described further hereinafter.

The rail 46 has attached thereto an outwardly extending plate 48 (Figs. 1 and 2). Interposed between the plate 48 and the base 8 are a plurality of vertically-disposed, parallel, rotatable shafts on which are mounted rollers 26 and 28. Interposed between the rollers 26 and 28 is a slidable cover removal bar 27 which is adapted to move in and out a predetermined distance; and is constantly urged inwardly by the vertically extending leaf spring 49. A stop projection 71 (Fig. 4) is attached to the rear face of the bar 27 to limit the inward movement of the bar when it engages one of the rollers 26. A roller 29 having a rotatable conical portion 29 is rotatably attached to the inner rear face of the cover removal bar 27 by bracket 55.

For removing the covers from the container, as will be described in detail later, the container is dropped in front of the pusher bar 17. The right hand cover 62 rides down on the guide 36 into the rear of stripper member 35 ready to be stripped. The left hand cover 61 strikes the conical roller 56 (Fig. 5) which is mounted coaxially of and to rotate with roller 29. Thus, the bar 27 can be forced outwardly, by the engagement of the cover 61 therewith, against the resistance of leaf spring 49 to permit the bar 27, the inner edge of which is the stripper for the left hand cover 61, to be positioned in accordance with the position of the left hand cover, ready to strip the left hand cover from the container.

When the container is positioned between the roller 29 and guide 36, and the pusher 17 is moved forward, the covers 61 and 62 will engage and will be held by the bar 27 and stop 35, respectively, and the covers will be stripped from the container.

The base 8 is provided with a pair of spaced openings 57, behind the cover removal bars 27 and 35, respectively, and forward of the front channel member 41, through which the covers of the container drop after being removed.

An elongated cylinder 23 (Fig. 1) is secured near the front of the base 8. The cylinder 23 is disposed outside the guideway 45 and is longitudinally parallel to the pusher bar 17. A piston rod 24 (Fig. 4) having a pusher head 25 attached to its outer end is reciprocable in the cylinder 23 and is adapted to move transversely of the guideways 44 and 45. Mounted alongside the cylinder 23 and parallel thereto is a tube 32 in which a guide rod 51, which is attached to the pusher head 25, reciprocates. When a container, from which the covers have been stripped, at the cover-removal station, is in line with head 25, the head can be moved to the left from the position shown in Fig. 1 to force the meat loaf out of the left hand end of the container onto a tray or other receiver (not shown) by which it can be transported for slicing, storage, or other operation.

A detent 65 (Figs. 2 and 4) is disposed beneath the rail 47 and above and forward of the head 25. The detent 65 is secured to the base 8 by means of an arm 66 which is pivotal at 67 on a bracket 68 that extends upward from the base 8. A spring 54 urges the arm 66 downward to insure engagement of the detent 65 with the flange portion 34' of the container when the container is in position for removal of its contents.

Mounted beneath the base 8 to project upwardly through slots 58 (see Figs. 3 and 4) in the plate 8 are pivoted positioning members or stops 30 and 31. Behind each of the pivotally mounted members 30 and 31 is a rod 52 which is slidable beneath the base 8. The rear end of each of the rods 52 is adapted to be engaged by the head of one of a pair of studs 53, which are attached to the pusher bar 17 by brackets 37 that are welded or otherwise fastened to the bar 17. When the pusher bar 17 is in its retracted position each of the brackets 37 fits in a respective recess 59 (see Fig. 4) formed in the edge of the openings 57. Upon forward movement of the pusher bar 17, studs 53 engage the bars 52 and pivot the stop members 30 and 31 upward so that they extend upward through openings 58 in the base 8 thereby limiting the forward movement of the can or container, which is being moved forward by the pusher bar 17 so that the container will be in axial alignment with the head 25.

This embodiment of the invention is provided with a plurality of mechanically actuated electrical contact switches which control the selective admission of fluid pressure to opposite ends of the cylinders 12, 13 and 23. A power switch 106 (Fig. 7) is provided to connect the machine to a suitable source of power through the lines $L_1$ and $L_2$. A switch 39 (Figs. 3 and 7) is mounted beneath the base 8 in engagement with the pivoting stop member 31. A switch 60 is mounted on the base 8 alongside the tube 32 (Figs. 1, 4 and 7). A safety switch 70 is mounted on the base 8 in the return path of the head 25 to prevent forward movement of the pusher bar 17 when the head 25 is not in its retracted position.

Referring to the diagram of Fig. 7, 100 designates a reciprocable solenoid operated valve which is controlled by switch 39. When the winding 101 is energized it shifts the valve 100 to the left from the position shown in Fig. 7 to admit compressed air to the left-hand end of the cylinder 23 for moving the piston rod 24 and the head 25 outward. The valve 100 also has a winding 102 controlled by switch 60. The energizing of winding 102 serves to admit air to the cylinder 23 for moving the piston rod 24 and the head 25 inward, that is, to the right in Figs. 1 and 4.

A valve 103 operated by solenoids 104 and 105 controls the movement of bar 17. The energizing of the winding 104 is controlled by switch 33. This operates valve 101 to admit air to the cylinders 12 and 13 to move the pusher bar 17 forward; and the energizing of the winding 105 operates the valve 103 of the cylinders 12 and 13 to move the bar 17 to its retracted position.

To use the machine, the switch 106 is turned to its "on" position. When cooking of the meat loaf in a container is completed, the container is lifted out of the steam cooker and placed on the rails 46 and 47. From there it is lowered onto the guideways 44 and 45 (Figs. 1 and 4) in front of the pusher bar 17 which is in its normal retracted position. The members 38 prevent the container 9 from being dropped on top of the pusher bar 17 when the container is lowered into operating position. The container hits the conical portion 56 of the roller 29 (Fig. 5) which moves the roller 29 outward so that its periphery engages the surface of the cover 61. With the roller 29 in this position, the bar 27 is in proper cover stripping position. The weight of the container 9 on the arm of the switch 33 (Figs. 3 and 7) closes the contact 81 (Fig. 7) of this switch, which energizes the winding 104 of the valve 103 by closing a circuit, which extends from $L_1$ and includes closed contact 80 of the power switch 106, wire 82, now-closed contact 81 of switch 33, normally-closed contact 83 of safety switch 70, wire 84, the winding 104 of valve 103, and wire 85 to $L_2$.

In response to the energizing of the winding 104, the valve 103 admits compressed air in cylinders 12 and 13 to move the piston rods 15 and 16 forward, thus causing the pusher bar 17 to push the container 9 forward along the guideways 44 and 45.

The bar 27 and guide roller 29 are so constructed that the inner edge of the bar 27 engages the lip 63 of cover 61 without touching the flange 34 of the container during its forward movement. The other cover 62 of the container rests against the guide 36 in position so that its lip 64 engages stop 35. The covers 61 and 62 are thus held by the cover removal bar 27 and the cover removal stop 35, respectively, while the container 9 continues to be moved forward by bar 17, with the result that covers 61 and 62 are stripped off the flanges 34 and 34', and drop through the openings 57 into a suitable receptacle.

At the end of the forward movement of the container, the detent 65 engages the flange 34'. When the container 9, with its end covers removed, reaches the position on the guideways 44 and 45 as shown by the dotted lines in Fig. 1, where it is aligned with the piston head 25, each of the studs 53 engages the respective rod 52 and pushes these rods forward causing the stop members 30 and 31 to pivot upward through the openings 58 in the base 8 (see Fig. 3), to engage the forward side of the container 9 thereby preventing its further forward movement. The container 9 is now securely held in position between pusher bar 17 and the positioning members 30 and 31. The container is now also held by the detent 65. The container is now in its contents removal position.

The pivotal movement of the positioning members 30 and 31 operates the switch 39 thereby closing its contact 86 which energizes the winding 101 of the valve 100 by a circuit, which extends from $L_1$ and includes wire 87, closed contact 86, winding 101, and wire 88, to $L_2$. The energizing of winding 101 operates valve 100 to cause compressed air to move the piston rod 24 with its attached head 25 outward and through the interior of the container. The contents of the container are thus pushed out of the left hand end of the container, by this action of the head 25.

When the head 25 has pushed the contents from the container which is determined by the bottoming of the piston in the right hand end of the cylinder 23 (Fig. 7), the switch 60 is actuated, thereby closing its contact 89 and the winding 105 of the valve 103. The circuit for energizing winding 101 extends from $L_1$ and includes wire 90, closed contact 89, wire 91, the winding 105, and wire 92 to $L_2$. The circuit for energizing winding 102 extends from $L_1$ and includes wire 90, closed contact 89, wire 93 the winding 102, and wire 94 to $L_2$. In response to the energizing of winding 102 of valve 100 air pressure is admitted to cylinder 23 to return the head 25 back through the container to its retracted normal position. In response to the energizing of winding 105 of valve 103, air pressure is admitted to cylinders 12 and 13 to move the pusher bar 17 to its retracted normal position. When the pusher bar 17 is retracted, the studs 53 move out of engagement with rods 52 thus causing the positioning members 30 and 31 to pivotally drop downward through the base 8, thereby permitting the empty container 9 to be pushed forward by a subsequent container onto the upturned ends of the guideways 44 and 45 where it may be removed from the machine.

It should be noted that the pusher bar 17 is interlocked with the head 25. Therefore, if for any reason the head 25 should fail to travel completely through the can, the machine will merely stop. It is also apparent from Fig. 7 that if the head 25 should become jammed in its outward limit position or during its return movement, the contact 83 of the switch 70 will remain open which will prevent the pusher bar 17 from moving forward to commence another sequence of operation.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A machine for removing the covers from both ends of a container, comprising a base, a pusher reciprocally mounted on said base, means for moving the pusher on said base in a forward direction, means supporting the container in position to be engaged and moved by the pusher upon the forward movement of said pusher, a first cover stripping means disposed alongside of the path of the forward movement of the pusher, a second cover stripping means attached to the base opposite the first cover stripping means, one of said cover stripping means being transversely slidable on said base, means urging the slidable cover stripping means towards the other stripping means, and means attached to said slidable cover stripping means for engaging one cover to position said slidable means to align with said one cover of the container, both said cover stripping means holding said covers during forward movement of the container.

2. A device according to claim 1 having a second pusher reciprocally attached to the base forward of the cover stripping means and movable transversely of the first pusher, means stopping the forward movement of the first pusher when the container is in alignment with the second pusher, and means thereupon actuating the second pusher to move said second pusher into the coverless container.

3. A device according to claim 2 wherein the means stopping the forward movement of the first pusher comprises a member pivotally mounted on said base alongside the path of the second pusher and operable to pivot upward through the base in response to the forward movement of the first pusher.

References Cited in the file of this patent

UNITED STATES PATENTS

| | | |
|---|---|---|
| 1,469,398 | Street | Oct. 2, 1923 |
| 2,368,020 | Hall | Jan. 23, 1945 |
| 2,795,344 | Lubischer | June 11, 1957 |